United States Patent [19]

Sheehy et al.

[11] Patent Number: 5,617,257

[45] Date of Patent: Apr. 1, 1997

[54] VARIABLE FOCUS ADAPTER

[75] Inventors: James B. Sheehy, Kintnersville; Kenneth W. Gish, Bensalem; John J. Sprenger, Southampton; William H. Finkbeiner, Jr., Levittown, all of Pa.

[73] Assignee: The United States of America as represented by the Secretary of the Navy, Washington, D.C.

[21] Appl. No.: 501,218

[22] Filed: Jul. 11, 1995

[51] Int. Cl.⁶ .................................... G02B 7/02
[52] U.S. Cl. .................. 359/818; 359/823; 359/827; 359/894; 359/418; 359/403; 359/425; 359/428
[58] Field of Search .................. 359/818, 823, 359/827, 894, 403, 404, 405, 406, 418, 419, 425, 426, 427, 428, 429

[56] References Cited

U.S. PATENT DOCUMENTS

| | | | |
|---|---|---|---|
| 3,782,822 | 1/1974 | Spence | 359/428 |
| 4,116,529 | 9/1978 | Yamaguchi | 359/894 |
| 4,249,799 | 2/1981 | Iglesias | 359/818 |
| 4,251,127 | 2/1981 | Yamaguchi | 359/894 |
| 5,221,992 | 6/1993 | Park | 359/894 |
| 5,289,320 | 2/1994 | Kobayashi | 359/823 |
| 5,361,162 | 11/1994 | Goebel | 359/418 |

*Primary Examiner*—Loha Ben
*Attorney, Agent, or Firm*—Susan E. Verona; Ron Billi

[57] ABSTRACT

A variable focus adapter is disclosed that comprises the combination of a lens and an aperture provided by a plate all lodged in a housing that is placed so that the lens is in proximity with each objective lens of a binocular arrangement to change the focal range from greater than 20 ft. to seven (7) ft. with a depth of field spanning from 5 to 15 ft.

17 Claims, 4 Drawing Sheets

VARIABLE FOCUS ADAPTER

STATEMENT OF GOVERNMENT'S INTEREST

This invention described herein, may be manufactured or used by and for the Government of the United States of America for governmental purposes without the payment of any royalty thereon or therefor.

BACKGROUND OF THE INVENTION

The human eye is a remarkably effective organ adaptable to a wide range of ambient light levels which can be functionally enhanced or improved by a host of optical instruments. For instance, visual function can be extended beyond the visible spectrum into the infrared portion of the spectrum by using night vision goggles and forward looking infrared devices (e.g., FLIRs) which are applicable to industrial applications, but particularly suited for military applications.

Night vision goggles (NVGs) are a helmet mounted binocular image intensifier. The NVG provides the user with a 30 to 40 degree intensified field of view with an enhanced acuity at low ambient light levels (quarter moon down through starlight). The latest version of NVGs, however, are fixed focus at optical infinity (>20 ft.) which makes them incompatible for use with any object, such as a terrain board used for training purposes, closer than 20 ft. Terrain boards have typical width and height dimensions of 10 by 10 ft. and allow users to become familiar with the operation and capabilities of the NVGs in a safe benign environment. To effectively use the terrain boards, the objects must remain in focus over a distance of 5 to 15 ft. from the NVG which represents a problem to the latest version of NVGs. To overcome this problem a solution is required that will allow the NVGs to be focused at a near distance with a large depth of field (i.e., the distance over which an object remains in focus) for the training periods. The solution should be easy to use, inexpensive, and readily adaptable to different fixed focus optical systems.

SUMMARY OF THE INVENTION

The present invention is an adapter that easily attaches to an optical instrument, such as the NVGs, to shift the focus of the instrument in from infinity to a near distance with a large depth of field. The adapter, herein termed "variable focus adapter," is a passive device which consists of a press-fit holder that slides onto the front of each NVG objective lens. Contained in each holder is a fixed aperture and a removable lens. In operation, the lens shifts the focus of the NVG in from optical infinity (>20 ft.) to approximately seven (7) ft. while the aperture increases the depth of field around this point. The main housing of the adapter includes a slotted surround that slides onto the NVG, the aperture, and an indented area in front of the aperture which houses the lens and a flexible retainer ring. The flexible retainer ring pinches together to fit into an indention in the housing to hold the lens in place and can be removed to allow the lens to be cleaned or changed.

Accordingly, it is the object of the present invention to provide an adapter that quickly changes the focal range of an optical instrument while still maintaining good resolution over that range so that the user can easily resolve objects of different contrasts and brightness within the predetermined focal range.

It is also the object of the present invention to provide an adapter that alters the focal range and is quickly attached to an optical instrument without the need to perform any modifications to or calibration of the optical instrument.

It is a further object of the present invention to provide an adapter that holds its elements in a stationary, predetermined optical relationship with respect to each other and the optical axis of the instrument, yet be easily disassembled for cleaning purposes.

Other objects, advantages and novel features of the invention will become apparent from the following detailed description when considered in conjunction with the accompanying drawings therein.

DETAILED DESCRIPTION OF THE PREFERRED EMBODIMENTS

The present invention is a variable focus adapter broadly directed to optical instruments having a wide range of applications. The principles of the present invention may be better appreciated by first referring to one application of the present invention directed to the latest version of the night vision goggle (NVG) 10 serving as the closest known prior art and illustrated in FIG. 1.

Figure 1:
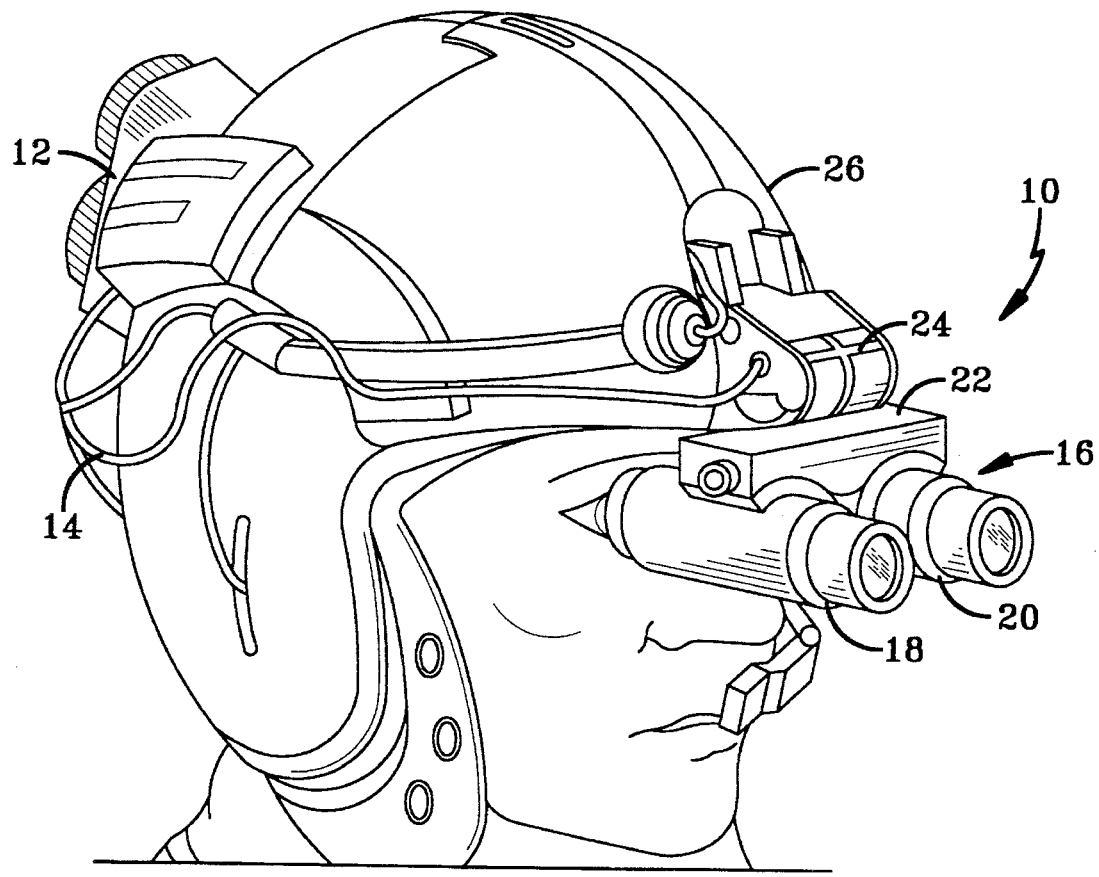
FIG. 1 illustrates a conventional helmet mounted night vision goggles (NVG) in the as-worn position.
Figure 2:
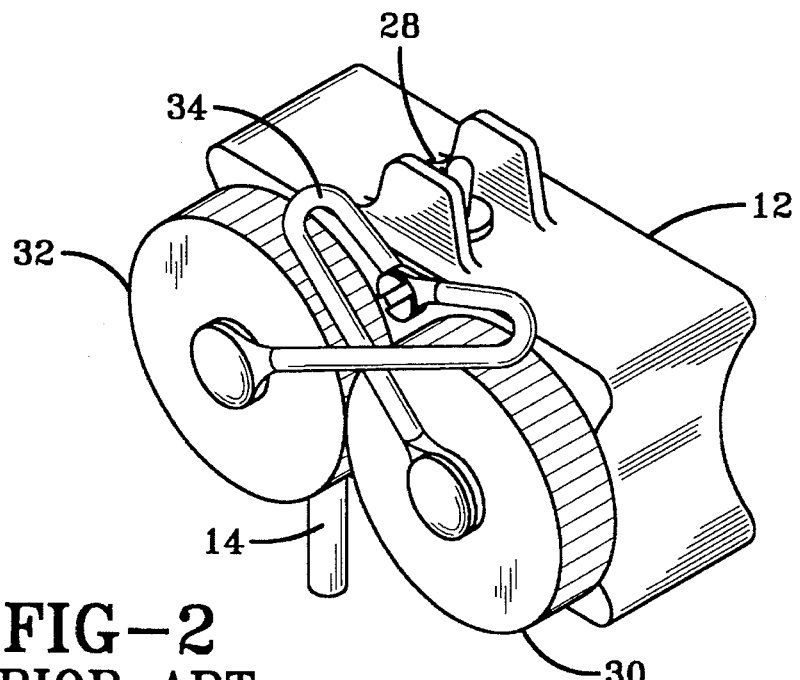
FIG. 2 illustrates the dual NVG battery pack of FIG. 1.

The NVG is a helmet mounted image intensifier which is shown in the as-worn position in FIG. 1 and comprises a battery pack 12 having an input/output power cable 14, a pair of binoculars 16 comprising monocular assemblies 18 and 20 arranged in side-by-side manner, an interpupillary adjustment shelf 22 attached to the monocular assemblies 18 and 20, and a mount 24. The NVG 10 is attached to a helmet 26 via a mount 24 which allows the NVG 10 to be removed or rotated up and out of the user's field of view when not in use. The NVG 10 is powered by a battery pack 12, shown in FIG. 2, that attaches to the rear of the helmet 26.

The battery pack 12 comprises a three position switch 28, and screw-on battery caps 30 and 32 with retainer straps 34. The battery pack 12 contains two independent batteries (not shown) which the user selects between using the toggle switch 28 to extend the NVG's 10 operating time.

The NVG monoculars 18 and 20 are connected to the helmet mount 24 by a coupling device 36 that is located above a platform 38 of the shelf 22. The platform 38 provides the housing for a plurality of adjustments for the monocular assemblies 18 and 20, such knob 40 that is used to adjust the separation between the NVG monoculars to accommodate the user's interpupillary distance (IPD), a forward/aft adjustment knob 42, and a tilt adjustment lever 44.

Figure 3:
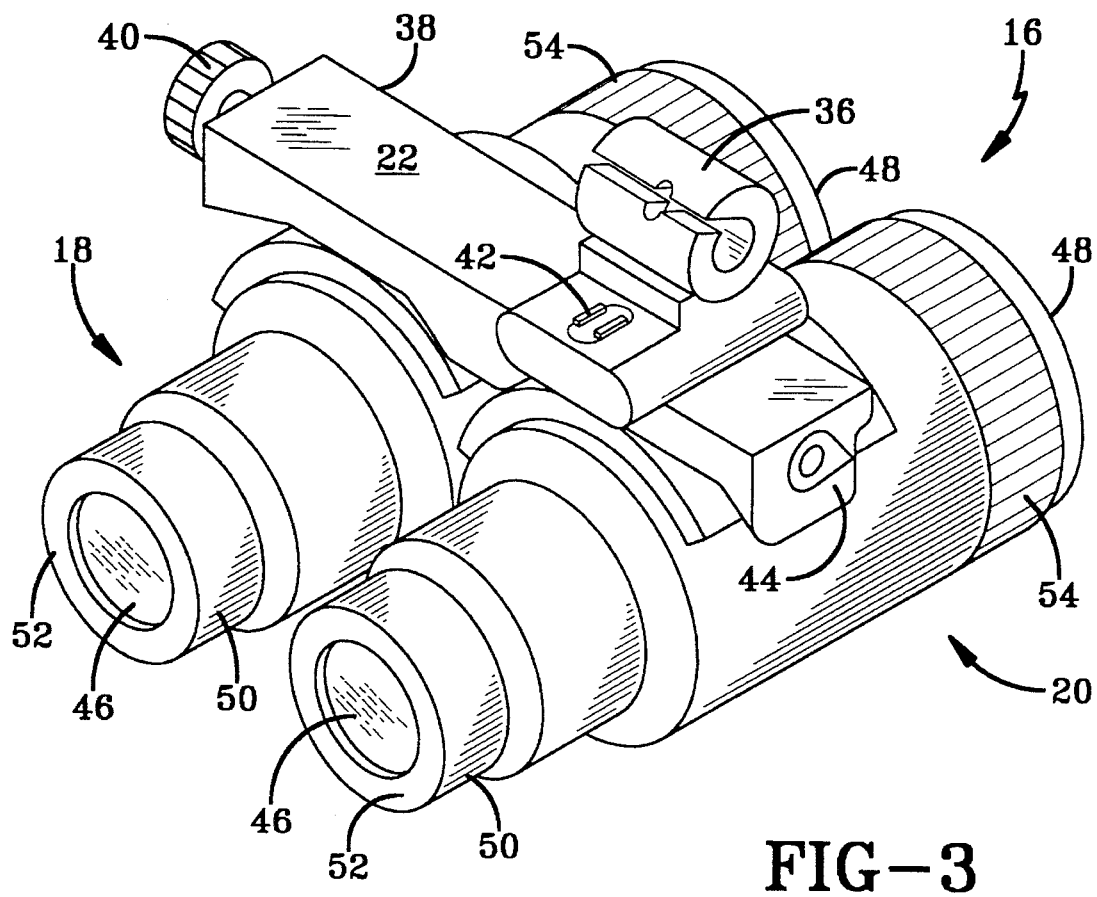
FIG. 3 illustrates NVG detached from the helmet of FIG. 1.

As known in the art, the NVGs 16 of FIG. 3 are sensitive to the near infrared spectrum of the night sky to provide a user with improved vision under low ambient light levels (quarter moon down to starlight). The NVG monocular assemblies include an objective lens 46 and an eyepiece lens 48 (not fully shown). Each objective lens 46 is mounted in an enclosure 50 having an entrance portion 52 with a predetermined diameter. Each eyepiece lens 48 cooperates with a respective eyepiece focus ring 54.

As discussed in the "Background" section, NVG 10, without the benefits of the present invention, is focused at optical infinity, a distance of 20 ft. or greater. The fixed focused night vision goggles (NVG) 10 are incompatible for viewing any object, such as a terrain board, closer than 20 ft. To effectively use the terrain boards, the objects must remain in focus over a distance of 5 to 15 ft. from the NVG 10. To accommodate this requirement, the NVG 10 needs to be focused at a near distance with a large depth of field (i.e., the distance over which an object remains in focus). The present invention alters the focal range of the NVG 10. The principles by which the present invention operates may be further described with reference to FIG. 4.

Figure 4:
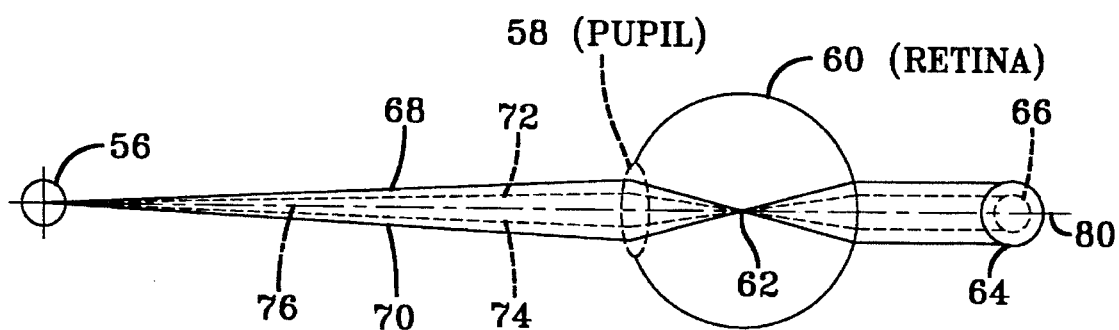
FIG. 4 is a general schematic illustrating the principle of operation of the present invention.

FIG. 4 illustrates the interrelationship between a distant object 56, a pupil 58, a retina 60, an image 62 on the retina 60, a first blur circle 64, a second blur circle 66, light rays 68 and 70 (shown as solid lines) associated with the first blur circle 64, light rays 72 and 74 (shown as dashed lines) associated with the second blur circle 66, and an on-axis 76.

In FIG. 4, the image of a distant object 56 on the retina is shown as a function of pupil size 58. The solid 68, 70 and dashed lines 72, 74 show the effect pupil size has on the retinal blur circle. More particularly, the blur circle 66 created by the dashed lines (72 and 74) as opposed to the blur circle 64 created by the solid lines (68 and 70) represents the effect pupil size has on the amount of image defocus. The only difference between these blur circles 64 and 66 is that pupil size has been reduced by one half. The diameter of the blur circle is directly related to the limiting resolution (acuity) of the eye for a particular situation. In order to achieve an acuity of 20/20, the image of the distant object 56 would correspond with the retinal plane and there would be no blur circle, i.e., the image 62 corresponds to the retina 60. Referring to FIG. 4, it may be seen that by continuing to decrease the diameter of the pupil a point may be reached where only on-axis 76 light rays enter the eye. At this point, the blur circle has been minimized and any point along this on-axis 76 will be in focus on the retina.

If two objects differ in distance from the eye, the diameter of the blur circles on the retina will differ as a function of the distance of the object relative to the eye's focus and the diameter of the pupil 58. If the pupil 58 of the eye is reduced, the range of distance over which an object imaged on the retina 60 will be of equal sharpness increases because the pupil 58 is now limiting the angle of the light reaching the eye, rather than the lens focusing the light to an equivalent sharpness. This was the principle behind the early pinhole cameras. There were no focusing optics just a pinhole located in front of the film plane to limit the angle of the light rays entering the camera. The major drawback of such pinhole cameras was that since most of the available light was thrown away, the camera only worked in bright light. The development of lens systems with apertures extended the useful range of the early camera both in terms of the optimum focus and light levels over which it functioned. The present invention comprises a plate having an aperture that functions in the same manner as the pinhole of the early cameras, but in addition thereto, further comprises a focusing lens that cooperates with the aperture both of which may be further described with reference to FIG. 5.

Figure 5A:
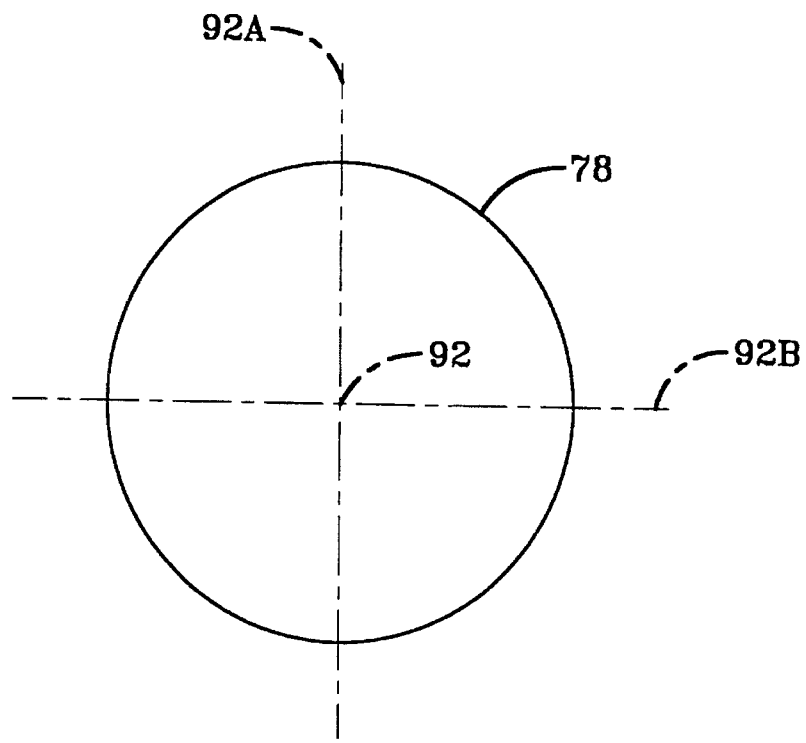
FIGS. 5(A), (B), (C), and (D) illustrate the various components which comprise the variable focus adapter of the present invention.
Figure 5B:
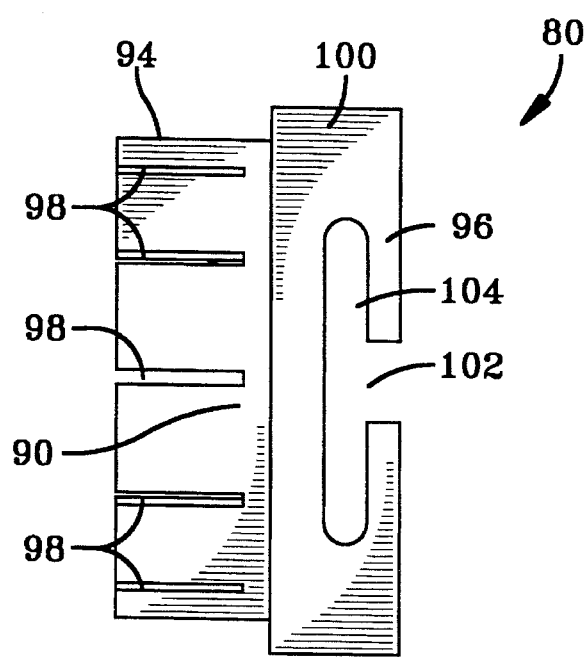
Figure 5C:
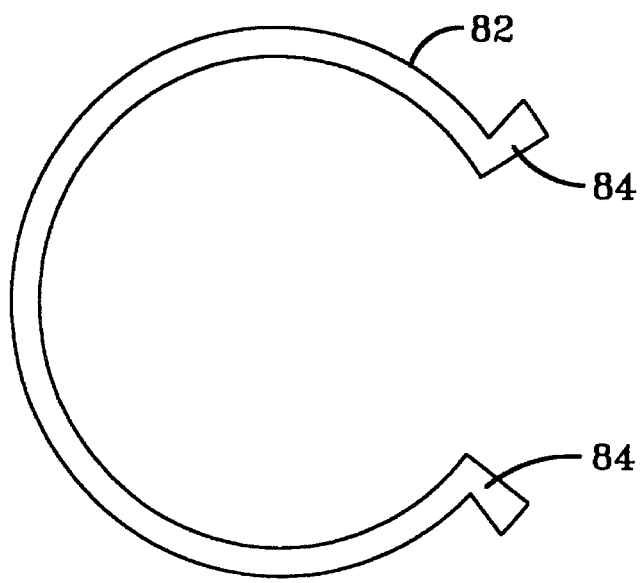

FIG. 5 is composed of FIGS. 5(A), (B), (C), and (D), that respectively illustrate a front view of an adapter lens 78, a side view of a main housing 80, a front view of a split-retainer ring 82 having ears 84 at opposite ends thereof, and a front view of the variable focus adapter 86 of the present invention having an integral plate 88 with a centrally located aperture 90 with a predetermined diameter in the range of 5 mm to 7 mm.

The adapter lens 78 is a positive (+) 0.25 diopter having a thickness of 2 mm and a diameter of 35 mm, wherein the +0.25 represents optical power of the lens 78. The adapter lens 78 has a predetermined optical axis 92 shown in FIG. 5(A) as the intersection point of dimensional lines 92A and 92B.

The housing 80 comprises a first portion 94 and a second portion 96. The first portion 94 serves as the means for mating the variable focus adapter 86 with the objective lens 46 of the NVG 10. More particularly, the first portion 94 has an inner diameter that corresponds to the outer diameter of the entrance portion 52 of the housing 50, both related to the objective lens 46 of each of the monocular assemblies 18 and 20. Furthermore, the first portion 94 serves as a wall or structure having a plurality of slots 98 circumferentially and equally spaced apart from each other which, in turn, serve as a means for allowing the first portion 94 to flex, yet frictionally engage the entrance portion 52 of each of the monocular assemblies 18 and 20. The plurality of slots 98 allows the housing 80 to serve as a press-fit holder. The second portion 96 has a depression 100 that is dimensioned to accommodate and hold the lens 78 and the split-retainer ring 82. Further, the second portion 96 has an opening 102 that allows for the insertion of the ears 84 of the retainer ring 82 so that the ears may find their way into a channel 104 in a snap-like manner.

The split-retainer ring 82 is formed of a flexible material and has an outer diameter of about 36 mm when in its relaxed state and an outer diameter of 35 mm when in its depressed state. Further, the split-retainer ring 82 is placed into its depressed state for insertion into opening 102 which may be further described with reference to FIG. 5(D).

Figure 5D:
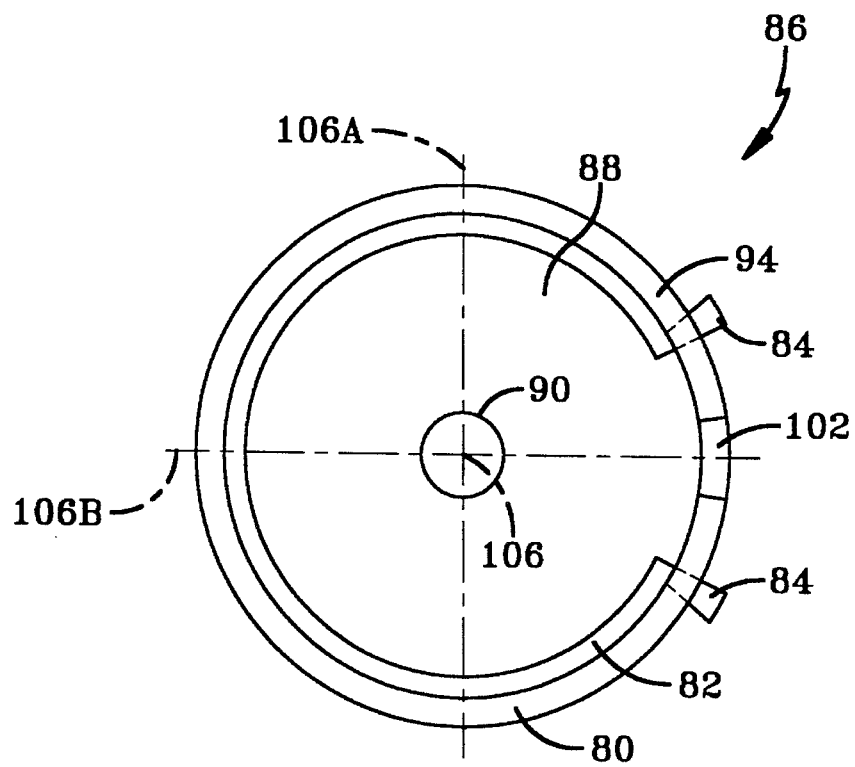

As seen in FIG. 5(D), the ears 84 of the split-retainer ring 82 are insertable into the opening 102 of the housing 80. As further seen in FIG. 5(D), the aperture 90, mounted in position by the housing 80, has an axis 106 illustrated by the intersection of dimensional lines 106A and 106B. The housing 80 also holds the adapter lens 78 in place. The adapter lens 78 is not shown in FIG. 5(D) so as to more clearly illustrate the aperture 90 of the plate 88. In actuality, the housing 80 mounts the plate 88 and holds the adapter lens 78 so that the axis 106 of the aperture 90 is coaxial and in correspondence with the axis 92 of the adapter lens 78. Further, it is desired that the housing 80 have an optical axis (not shown) that is coaxial with the axis of each of the lens 78 and aperture 90.

In operation, the variable focus adapter 86 of the present invention, via the first portion 94, slips over the housing 50 of the NVG 10 so that each of the adapter lens 78 is in close proximity with the objective lens 46 of each of the monocular assemblies 18 and 20, that is, the lens nearest the object to be viewed by the NVG 10. The positive adapter lens 78 shifts the focus of the NVG 10 from optical infinity to about seven (7) ft. while the aperture 90 increases the depth of field so that objects from 5 to 15 ft. are in sharp focus. The depth of field from 5 to 15 ft. corresponds to the desired depth of field utilized to facilitate the viewing of the terrain board for training purposes.

It should now be appreciated that the practice of the present invention provides for an adapter lens 78 and a plate 88 having an aperture 90 all lodged in a housing 80 that is placed in close proximity to the objective lens of an optical instrument, such as a NVG 10, to quickly change the existing focal range to a desired focal range.

Further, it should be appreciated that the practice of the present invention provides a split-retainer ring 82 that is easily insertable and removable from the housing 80 so that the adapter lens 78 may be easily cleaned or replaced, thereby, facilitating maintenance of the optical instrument 10.

Although the description of the variable focus adapter herein is directed to night vision goggles, the basic principles of the invention are applicable to any fixed focus optical instrument whose focal range must be easily and quickly changed to a predetermined focal range that is suited to a particular application.

Many modifications or variations of the present invention are possible in view of the above disclosure. It is, therefore, to be understood, that within the scope of the appended claims, the invention may be practiced otherwise as specifically described.

What we claim is:

1. An adapter for varying the focus and depth of field of an optical instrument having at least one objective lens having forward and aft ends with the forward end facing an object to be focused by said optical instrument, said adapter comprising:

(a) an adapter lens having a predetermined optical power and an optical axis;

(b) a plate having a centrally located aperture with a predetermined diameter and an optical axis; and (c) a housing having provisions for holding said plate and said adapter lens at said forward end of said at least one objective lens so that said optical axis of said lens is coaxial and in correspondence with said optical axis of said aperture, said housing having means so that said adapter lens and said aperture are placed in close proximity with said objective lens of said optical instrument.

2. The adapter according to claim 1 further comprising a split-retainer ring having an ear at each end and said housing further having means to accept said ears so that said adapter lens is fixed in position in said housing.

3. The adapter according to claim 2, wherein said housing is cylindrical and has a first portion forming a wall having a plurality of slots circumferentially and equally spaced apart from each other allowing flexibility to facilitate placing said housing so that said adapter lens and said aperture are in close proximity with said objective lens, and a second portion having said means to accept said ears, said first portion comprising said means so that said adapter lens and said aperture are placed in close proximity with said objective lens.

4. The adapter according to claim 1, wherein said plate is integral with said housing.

5. An adapter for varying the focus and depth of field of an optical instrument having at least one objective lens having forward and aft ends with the forward end facing an object to be focused by said optical instrument, said adapter comprising:

(a) an adapter lens having a predetermined optical power and an optical axis;

(b) a plate having a centrally located aperture with a predetermined diameter and an optical axis; and (c) a housing having provisions for holding said plate and said adapter lens at said forward end of said at least one objective lens so that said optical axis of said lens is coaxial and in correspondence with said optical axis of said aperture, said housing having means so that said adapter lens and said aperture are placed in close proximity with said objective lens of said optical instrument wherein said adapter lens is a +0.25 lens and said aperture has a diameter in the range from 5 mm to 7 mm so that focus of said optical instrument is alterable from an optical infinity exceeding 20 feet to be within a range of seven (7) feet with a depth of field spanning from 5 to 15 feet when said adapter lens and said aperture are placed in close proximity to said objective lens.

6. An adapter for varying the focus and depth of field of an optical instrument having at least one objective lens having forward and aft ends with the forward end facing an object to be focused by said optical instrument, said adapter comprising:

(a) an adapter lens having a predetermined optical power and an optical axis;

(b) a plate having a centrally located aperture with a predetermined diameter and an optical axis; and (c) a housing having provisions for holding said plate and said adapter lens at said forward end of said at least one objective lens so that said optical axis of said lens is coaxial and in correspondence with said optical axis of said aperture, said housing having means so that said adapter lens and said aperture are placed in close proximity with said objective lens of said optical instrument wherein said housing has an optical axis and wherein said provisions include means for holding said plate and said lens so that said optical axis of said adapter lens is coaxial and in correspondence with the optical axis of each of said aperture and said housing.

7. An optical instrument having at least one objective lens having forward and aft ends with the front end facing an object to be focused by said optical instrument, said at least one objective lens being confined in an enclosure having an entrance portion, said optical instrument comprising:

(a) an adapter lens having a predetermined optical power and an optical axis;

(b) a plate having a centrally located aperture with a predetermined diameter and an optical axis; and (c) a housing having provisions for holding said plate and said adapter lens at said forward end of said at least one objective lens so that said optical axis of said lens is coaxial and in correspondence with said optical axis of said aperture, said housing having means so that said adapter lens and said aperture are placed in close proximity with said objective lens.

8. The optical instrument according to claim 7, wherein said adapter lens has an optical power of +0.25 and said aperture has a diameter in the range from 5 mm to 7 mm so that focus of said optical instrument is alterable from an optical infinity exceeding twenty (20) feet to be within a range of seven (7) feet with a depth of field spanning from 5 to 15 feet when said adapter lens and said aperture are placed in close proximity to said objective lens.

9. The optical instrument according to claim 7 further comprising a split-retainer ring having an ear at each opposite end and said housing further having means to accept said ears so that said adapter lens is fixed in position in said housing.

10. The optical instrument according to claim 9, wherein said housing is cylindrical and has a first portion forming a wall having a plurality of slots circumferentially and equally spaced apart from each other allowing flexibility to facilitate placing said housing so that said adapter lens and said aperture are in close proximity with said objective lens, and a second portion having said means to accept said ears.

11. The adapter according to claim 7, wherein said plate is integral with said housing.

12. An optical instrument having two monocular assemblies arranged side-by-side to form a pair of binoculars sensitive to the infrared spectrum so as to provide night vision for the user of said binoculars, each of said monocular assemblies having an objective lens having forward and aft ends with the front end facing an object to be focused by said optical instrument, said at least one objective lens being confined in an enclosure having an entrance portion, said pair of night-vision binoculars comprising:

(a) an adapter lens having a predetermined optical power and an optical axis;

(b) a plate having a centrally located aperture with a predetermined diameter and an optical axis; and (c) a housing having provisions for holding said plate and said adapter lens at said forward end of said at least one objective lens so that said optical axis of said lens is coaxial and in correspondence with said optical axis of said aperture, said housing having means for engaging said entrance portion so that said adapter lens and said aperture are in close proximity with said objective lens.

13. The optical instrument according to claim 12, wherein said adapter lens has an optical power of +0.25 and said aperture has a diameter in the range from 5 mm to 7 mm so that focus of said optical instrument is alterable from an optical infinity exceeding twenty (20) feet to be within a range of seven (7) feet with a depth of field spanning from 5 to 15 feet when said adapter lens and said aperture are placed in close proximity to said objective lens.

14. The optical instrument according to claim 12 further comprising a split-retainer ring having an ear at each opposite end and said housing further having means to accept said ears so that said adapter lens is fixed in position in said housing.

15. The optical instrument according to claim 12, wherein said plate is integral with said housing.

16. The optical instrument according to claim 12, wherein said housing has an optical axis and wherein said provisions include means for holding said plate and said adapter lens so that said optical axis of said adapter lens is coaxial and in correspondence with the optical axis of each of said aperture and said housing.

17. An adapter for varying the focus and depth of field of an optical instrument having at least one objective lens having forward and aft ends with the forward end facing an object to be focused by said optical instrument, said adapter comprising:

(a) an adapter lens having a predetermined optical power and an optical axis;

(b) a plate having a centrally located aperture with a predetermined diameter and an optical axis; and (c) a housing having provisions for holding said plate and said adapter lens at said forward end of said at least one objective lens so that said optical axis of said lens is coaxial and in correspondence with said optical axis of said aperture, said housing having means so that said adapter lens and said aperture are placed in close proximity with said objective lens of said optical instrument;

wherein said adapter lens is a +0.25 lens and said aperture has a diameter in the range from 5 mm to 7 mm so that focus of said optical instrument is alterable from an optical infinity exceeding 20 feet to be within a range of seven (7) feet with a depth of field spanning from 5 to 15 feet when said adapter lens and said aperture are placed in close proximity to said objective lens; and wherein said housing has an optical axis and wherein said provisions include means for holding said plate and said lens so that said optical axis of said adapter lens is coaxial and in correspondence with the optical axis of each of said aperture and said housing.

* * * * *